(12) United States Patent
Gandhi et al.

(10) Patent No.: US 12,184,543 B2
(45) Date of Patent: *Dec. 31, 2024

(54) IN-SITU OPERATION, ADMINISTRATION, AND MAINTENANCE IN SEGMENT ROUTING WITH MULTIPROTOCOL LABEL SWITCHING NETWORKS

(71) Applicant: Cisco Technology, Inc., San Jose, CA (US)

(72) Inventors: Rakesh Gandhi, Stittsville (CA); Sagar Soni, Ottawa (CA); Patrick Khordoc, Ottawa (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 650 days.

This patent is subject to a terminal disclaimer.

(21) Appl. No.: 17/239,003

(22) Filed: Apr. 23, 2021

(65) Prior Publication Data
US 2021/0243117 A1 Aug. 5, 2021

Related U.S. Application Data

(63) Continuation of application No. 16/276,847, filed on Feb. 15, 2019, now Pat. No. 11,032,193.
(Continued)

(51) Int. Cl.
*H04L 69/22* (2022.01)
*H04L 41/142* (2022.01)
(Continued)

(52) U.S. Cl.
CPC .......... *H04L 45/507* (2013.01); *H04L 41/142* (2013.01); *H04L 45/24* (2013.01); *H04L 69/22* (2013.01)

(58) Field of Classification Search
CPC ....... H04L 45/50; H04L 41/142; H04L 69/22; H04L 45/507; H04L 43/0852; H04L 45/34; H04L 43/106; H04L 45/24
See application file for complete search history.

(56) References Cited

U.S. PATENT DOCUMENTS 9,237,078 B1 * 1/2016 Nainar ................ H04L 43/0811
9,369,371 B2   6/2016 Filsfils et al.
(Continued)

OTHER PUBLICATIONS

F. Brockners et al., "Data Fields for In-situ OAM", draft-ietf-ippm-ioam-data-04, ippm, Internet-Draft, Oct. 20, 2018, 39 pages.
(Continued)

*Primary Examiner* — Hanh N Nguyen
(74) *Attorney, Agent, or Firm* — Edell, Shapiro & Finnan, LLC

(57) ABSTRACT

Presented herein is an "In-situ OAM" (IOAM) mechanism that uses a Segment Routing-Multiprotocol Label Switching (SR-MPLS) IOAM segment identifier that can selectively collect IOAM data from "target" network nodes along a data packet path. In one embodiment, a method includes receiving, at a first network node in the SR-MPLS network, a data packet that includes an MPLS label stack comprising a plurality of segment identifiers (SIDs) associated with a plurality of network nodes. The MPLS label stack includes a first SID associated with the first network node. The method includes determining whether the first SID is an IOAM SID or a regular SID. Upon determining that the first SID is the IOAM SID, the method includes implementing an IOAM function at the first network node. Upon determining that the first SID is the regular SID, the method includes processing the data packet without implementing an IOAM function.

20 Claims, 11 Drawing Sheets

Related U.S. Application Data

(60) Provisional application No. 62/729,618, filed on Sep. 11, 2018.

(51) Int. Cl.
*H04L 45/24* (2022.01)
*H04L 45/50* (2022.01)

(56) References Cited

U.S. PATENT DOCUMENTS

| | | | | |
|---|---|---|---|---|
| 9,992,056 | B2* | 6/2018 | Ward | H04L 41/0631 |
| 10,277,471 | B2 | 4/2019 | Ubaldi et al. | |
| 10,693,777 | B2* | 6/2020 | Pignataro | H04L 41/0894 |
| 11,032,193 | B2* | 6/2021 | Gandhi | H04L 45/507 |
| 11,533,258 | B2* | 12/2022 | Gandhi | H04L 43/0835 |
| 2013/0063441 | A1* | 3/2013 | Choy | H04L 43/0876 |
| | | | | 345/440.2 |
| 2016/0099853 | A1 | 4/2016 | Nedeltchev et al. | |
| 2017/0250907 | A1* | 8/2017 | Pignataro | H04L 43/04 |
| 2018/0063018 | A1 | 3/2018 | Bosch et al. | |
| 2019/0182103 | A1* | 6/2019 | Pignataro | H04L 41/16 |
| 2019/0260657 | A1 | 8/2019 | Filsfils et al. | |
| 2019/0280927 | A1 | 9/2019 | Filsfils et al. | |
| 2019/0296988 | A1* | 9/2019 | Bhandari | H04L 47/125 |
| 2019/0372877 | A1* | 12/2019 | Nainar | H04L 45/16 |
| 2020/0007388 | A1* | 1/2020 | Johnston | H04L 41/083 |
| 2020/0084147 | A1 | 3/2020 | Ganghi et al. | |
| 2021/0075738 | A1* | 3/2021 | Clemm | H04L 69/22 |
| 2021/0135986 | A1* | 5/2021 | Song | H04L 69/22 |

OTHER PUBLICATIONS

A. Farrel et al., "An MPLS-Based Forwarding Plane for Service Function Chaining", draft-ietf-mpls-sfc-00, MPLS Working Group, Internet-Draft, Mar. 28, 2018, 24 pages.

S. Previdi, Ed. et al., "IS-IS Extensions for Segment Routing", draft-ietf-isis-segment-routing-extensions-19, IS-IS for IP Internets, Internet-Draft, Jul. 19, 2018, 35 pages.

R. Gandhi, Ed. et al., "Segment Routing with MPLS Data Plane Encapsulation for In-situ OAM Data", draft-gandhi-spring-ioam-sr-mpls-00, SPRING Working Group, Internet-Draft, Oct. 23, 2018, 7 pages.

C. Li et al., Network Working Group, "Passive Performance Measurement for SRv6 Network Programming", draft-li-spring-passive-pm-for-srv6-np-00, Mar. 5, 2018, 17 pages.

S. Deering et al., "Internet Protocol, Version 6 (IPv6) Specification", Jul. 2017, Internet Engineering Task Force (IETF), ISSN: 2070-1721, 42 pages.

S. Bryant et al., RFC 7876, "UDP Return Path for Packet Loss and Delay Measurement for MPLS Networks", Internet Engineering Task Force (IETF), ISSN: 2070-1721, Jul. 2016, 10 pages.

D. Frost et al., RFC 6374, "Packet Loss and Delay Measurement for MPLS Networks", Internet Engineering Task Force (IETF), ISSN: 2070-1721, Sep. 2011, 52 pages.

A. Farrel et al., MPLS Working Group, "An MPLS-Based Forwarding Plane for Service Function Chaining", draft-ietf-mpls-sfc-04, Nov. 20, 2018, 28 pages.

C. Filsfils et al., Network Working Group, "IPv6 Segment Routing Header (SRH)", draft-ietf-6man-segment-routing-header-15, Oct. 22, 2018, 28 pages.

C. Filsfils et al., "SRv6 Network Programming", draft-filsfils-spring-srv6-network-programming-06, Oct. 22, 2018, 55 pages.

C. Filsfils et al., "Segment Routing Policy Architecture", draft-filsfils-spring-segment-routing-policy-06.txt, May 21, 2018. 34 pages.

F. Brockners et al., "Geneve encapsulation for In-situ OAM Data", draft-brockners-ippm-ioam-geneve-01, Internet-Draft, Intended status: Standards Track, Jun. 27, 2018, 10 pages.

R. Gandhi, Ed. et al., "Performance Measurement in Segment Routing Networks with MPLS Data Plane", draft-gandhi-spring-sr-mpls-pm-02, SPRING Working Group, Internet-Draft, Intended Status: Informational, Jul. 15, 2018, 14 pages.

H. Song, Ed. et al., "Export User Flow Telemetry Data by Postcard Packets", draft-song-ippm-postcard-based-telemetry-00, IPPM, Internet-Draft, Intended status: Standards Track, Oct. 20, 2018, 16 pages.

C. Filsfils, Ed. et al., "Segment Routing Architecture", Internet Engineering Task Force (IETF), Request for Comments: 8402, Category: Standards Track, ISSN: 2070-1721, Jul. 2018, 32 pages.

C. Filsfils, Ed. et al., "Resiliency Use Cases in Source Packet Routing in Networking (SPRING) Networks", Internet Engineering Task Force (IETF), Request for Comments: 8355, Category: Informational, ISSN: 2070-1721, Mar. 2018, 13 pages.

* cited by examiner

IN-SITU OPERATION, ADMINISTRATION, AND MAINTENANCE IN SEGMENT ROUTING WITH MULTIPROTOCOL LABEL SWITCHING NETWORKS

CROSS-REFERENCE TO RELATED APPLICATION

This application is a continuation of U.S. application Ser. No. 16/276,847, filed Feb. 15, 2019, and issued on Jun. 8, 2021, as U.S. Pat. No. 11,032,193, which claims the benefit of priority under 35 U.S.C. § 119 to U.S. Provisional Patent Application Ser. No. 62/729,618, entitled "Targeted IOAM in SR-MPLS Networks for Proof of Transit and Performance Measurement", filed on Sep. 11, 2018. The disclosure of each of these applications is hereby incorporated by reference in its entirety.

TECHNICAL FIELD

The present disclosure relates to computer networking.

BACKGROUND

In-Situ Operation, Administration, and Maintenance (IOAM) records OAM information within the packet while the packet traverses a particular network domain. This is required for many reasons including but not limited to proof-of-transit and performance delay and/or loss measurement. The term "in-situ" refers to the fact that the OAM data is added to the data packets rather than being sent within packets specifically dedicated to OAM, such as probe packets, and enable networks to monitor actual traffic flows.

One conventional approach to enable IOAM collection in a Segment Routing-Multiprotocol Label Switching (SR-MPLS) network is to carry IOAM data fields, as defined in Internet Engineering Task Force (IETF) publication "Data Fields for In-situ OAM" available at datatracker.ietf.org/doc/draft-ietf-ippm-ioam-data, in MPLS Header Metadata. An IOAM Metadata Indicator Label (MIL), Special/Reserved Indicator Label, or Network Programming Indicator Label from the Segment Routing Global Block (SRGB) is added to the header in metadata when IOAM data collection is enabled. These labels are added at the bottom of the MPLS label stack with an end-of-stack (EOS) flag set to 1. Any node that detects these labels which may indicate different functions, such as "end-to-end IOAM", "hop-by-hop IOAM", or "hop-by-hop recording with end-to-end IOAM", etc., inserts and processes the IOAM data in the packet. Such IOAM functions may be indicated by using different MTh label values or using different Types in the IOAM metadata TLVs. However, this approach can only support either "end-to-end" (i.e., between endpoint nodes) or "hop-by-hop" (i.e., on all transit nodes) IOAM monitoring. There are requirements where IOAM monitoring is needed only on some transit nodes in the data packet path (e.g., for trouble shooting), which cannot be handled using the conventional approach.

One of the challenges associated with IOAM mechanisms is the difficulty to implement it in hardware without performance penalty. An indication needs to be present in the packet header that the hardware needs to check in each data packet to determine whether or not the "In-situ OAM" capability is enabled. Enabling "In-situ OAM" on all data packets for all transit and egress nodes can lead to further performance issues as well as packet processing issues due to header sizes becoming too large and unnecessarily processing all data packets in the network.

DESCRIPTION OF EXAMPLE EMBODIMENTS

Overview

Presented herein is an "In-situ OAM" mechanism that uses an SR-MPLS IOAM segment identifier that can selectively collect IOAM data from "target" network nodes along a data packet path. In an example embodiment, a method for providing in-situ operation, administration, and maintenance (IOAM) data in a Segment Routing-Multiprotocol Label Switching (SR-MPLS) network is provided that includes receiving, at a first network node in the SR-MPLS network, a data packet that includes an MPLS label stack comprising a plurality of segment identifiers (SIDs) associated with a plurality of network nodes in the SR-MPLS network. The MPLS label stack includes a first SID associated with the first network node. The method also includes determining whether the first SID associated with the first network node included in the MPLS label stack is an IOAM SID or a regular SID. Upon determining that the first SID is the IOAM SID, the method includes implementing an IOAM function at the first network node. Upon determining that the first SID is the regular SID, the method includes processing the data packet without implementing an IOAM function.

Example Embodiments

The example embodiments described herein provide an IOAM mechanism that selectively collects IOAM data from one or more transit nodes. The example embodiments may be described with reference to several conventions for a SR-MPLS network, including: Segment Routing Global Block: 16000 to 23999; Service labels: greater than 100000; Node k has a Prefix SID 1.1.1.k/32; Node k has Prefix SID label 16000+k; Link Address of $n^{th}$ adjacency between XY: 99.X.Y.nX; For IOAM, Link Address of $n^{th}$ adjacency between XY: 88.X.Y.nX; and MPLS label $n^{th}$ adjacency between XY: 24nXY.

SR-MPLS IOAM SID—Procedure

Presented herein is an IOAM mechanism using an SR-MPLS IOAM Segment Identifier (SID). This mechanism is configured to selectively collect IOAM data from one or more "target" network nodes in a SR-MPLS network. Using the IOAM mechanism described herein, there is no need for a node to look for an IOAM Metadata Indicator Label (MIL)(i.e., a Special/Reserved Indicator Label or Network Programming Indicator Label from the Segment Routing Global Block (SRGB)) in an incoming packet which is typically at the bottom of the MPLS label stack (e.g., with an EOS Flag set to 1), as in the conventional approach. According to the techniques of the example embodiments, the action by a network node to perform the IOAM function is based on the SR-MPLS IOAM SID. In this way, only network nodes for which the local SID==IOAM SID will insert or process the IOAM data to the packet.

Figure 1:
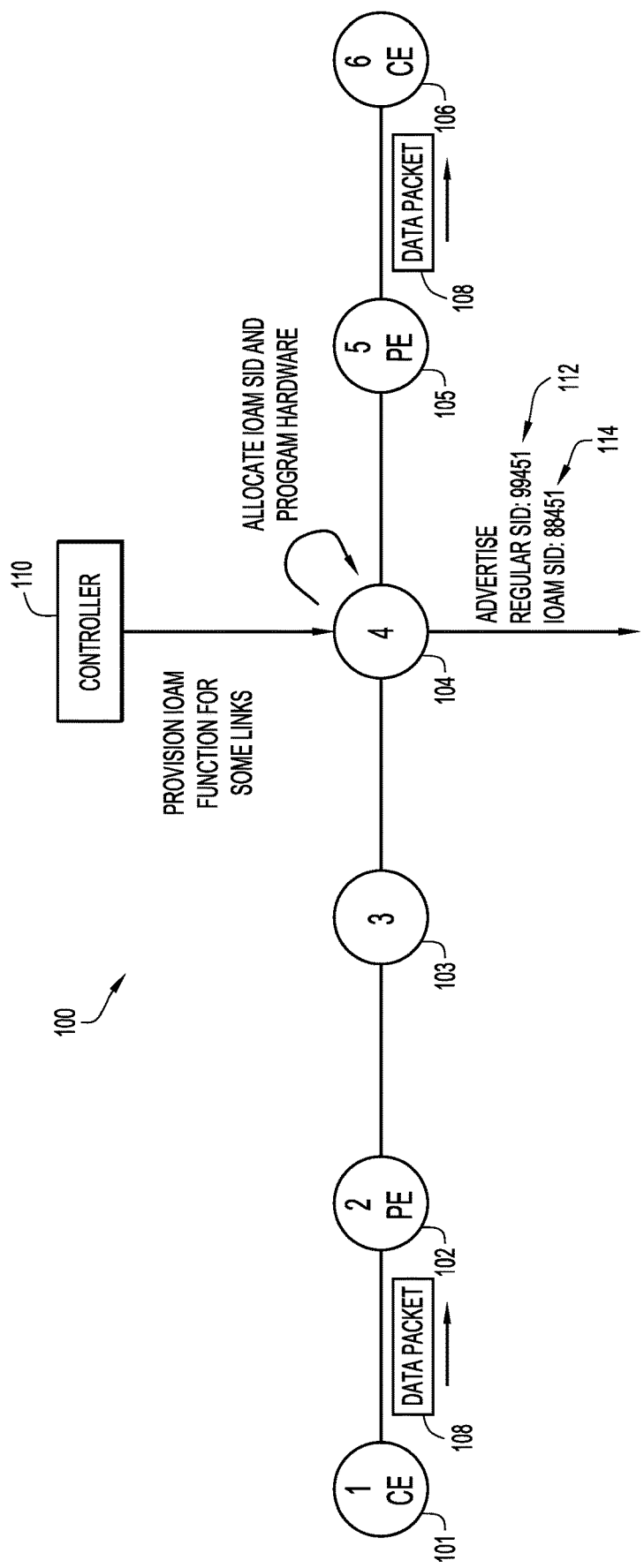
FIG. 1 is a diagram illustrating a network controller in an SR-MPLS network allocating an IOAM function on network nodes, according to an example embodiment.

Referring now to FIG. 1, a network 100 is shown in which a mechanism for implementing an IOAM function at a target network node may be implemented, according to an example embodiment. In an example embodiment, network 100 is a SR-MPLS network. In this embodiment, network 100 may include a plurality of network nodes or elements, including at least a first network node 101, a second network node 102, a third network node 103, a fourth network node 104, a fifth network node 105, and a sixth network node. In this embodiment, first network node 101 and sixth network node 106 may be customer edge nodes (e.g., a router) that is located on a customer's premises that provides an interface to/from a provider's core network. For example, in this embodiment, the provider's core network may be represented by second network node 102, third network node 103, fourth network node 104, and fifth network node 105 of network 100.

Network nodes 101, 102, 103, 104, 105, 106 may be any computer, server, router, switch, bridge, gateway, load-balancer, firewall, processor, network appliance, or any other suitable device, component, element, or object capable of sending, receiving, or forwarding information over a communication network, for example, network 100. The network nodes may be physical, virtual (e.g., implemented in software), or a combination of both.

In this embodiment, network 100 includes six representative network nodes 101, 102, 103, 104, 105, 106 however, it should be understood that network 100 may include any number of network nodes or elements. For example, in some embodiments, network 100 may include hundreds, thousands, tens of thousands, or more, of network nodes.

As shown in FIG. 1, one or more data packets may originate from first network node 101. A traffic flow may comprises a plurality of packets, including a data packet 108. Data packet 108 may be forwarded through network 100 from second network node 102 (i.e., an ingress node) to fifth network node 105 (i.e., an egress node), including traversing through one or more transit nodes in between. In this embodiment, third network node 103 and fourth network node 104 are transit nodes.

Additionally, network 100 may further include a network controller 110 that provides monitoring, control, and management operations to one or more components of network 100, including first network node 101, second network node 102, third network node 103, fourth network node 104, fifth network node 105, and sixth network node 106.

According to the techniques presented herein, a network node advertises an SR-MPLS IOAM SID (which can be a prefix SID and/or an adjacency SID), in addition to its regular prefix SID and/or adjacency SID, to provide an IOAM function when receiving a data packet that includes the IOAM SID. The network node programs the SR-MPLS IOAM SID in its local forwarding in hardware to provide the IOAM functionality ahead of time, thereby optimizing the hardware processing. For example, as shown in FIG. 1, fourth network node 104 advertises a regular SID 112 (99451) and an IOAM SID 114 (88451) associated with an IOAM function.

In some embodiments, an IOAM function may include a first IOAM function (e.g., "Insert IOAM Data") that includes inserting the network node-address and a time-stamp in a metadata header of a packet and forwarding the packet to a next network node (e.g., the next SID listed in an MPLS label stack). For example, this first IOAM function may be implemented at a network node for Proof-of-Transit use cases.

In other embodiments, an IOAM function may include a second IOAM function (e.g., "Forward and Punt") that includes forwarding a packet to a next network node (e.g., the next SID listed in an MPLS label stack) and punting a timestamped copy of the packet to a designated network node (e.g., as designated by the SR policy). For example, this IOAM function may be implemented at a network node for Performance Measurement use cases between two endpoints (i.e., nodes) in the network.

In various embodiments, IOAM data (also referred to as IOAM metadata) may include one or more of the following types of information: node or link addresses (e.g., for proof-of-transit), prefix, node, or adjacency/link SIDs, transmit/receive (TX/RX) timestamps (e.g., for performance delay measurement), TX/RX packet counters (e.g., for performance loss measurement) and sequence numbers, as well as other timestamps or other telemetry data about path and/or performance information. The IOAM data may also contain the context information for the SR Policy which may include but is not limited to: Border Gateway Protocol (BGP) color, endpoint address, ingress node ID, Flow-identifier, etc. Further, IOAM data Type may also indicate node functions such as "end-to-end IOAM", or "Hop-by-hop IOAM" or "Hop-by-hop recording with end-to-end IOAM", etc.

Figure 2:
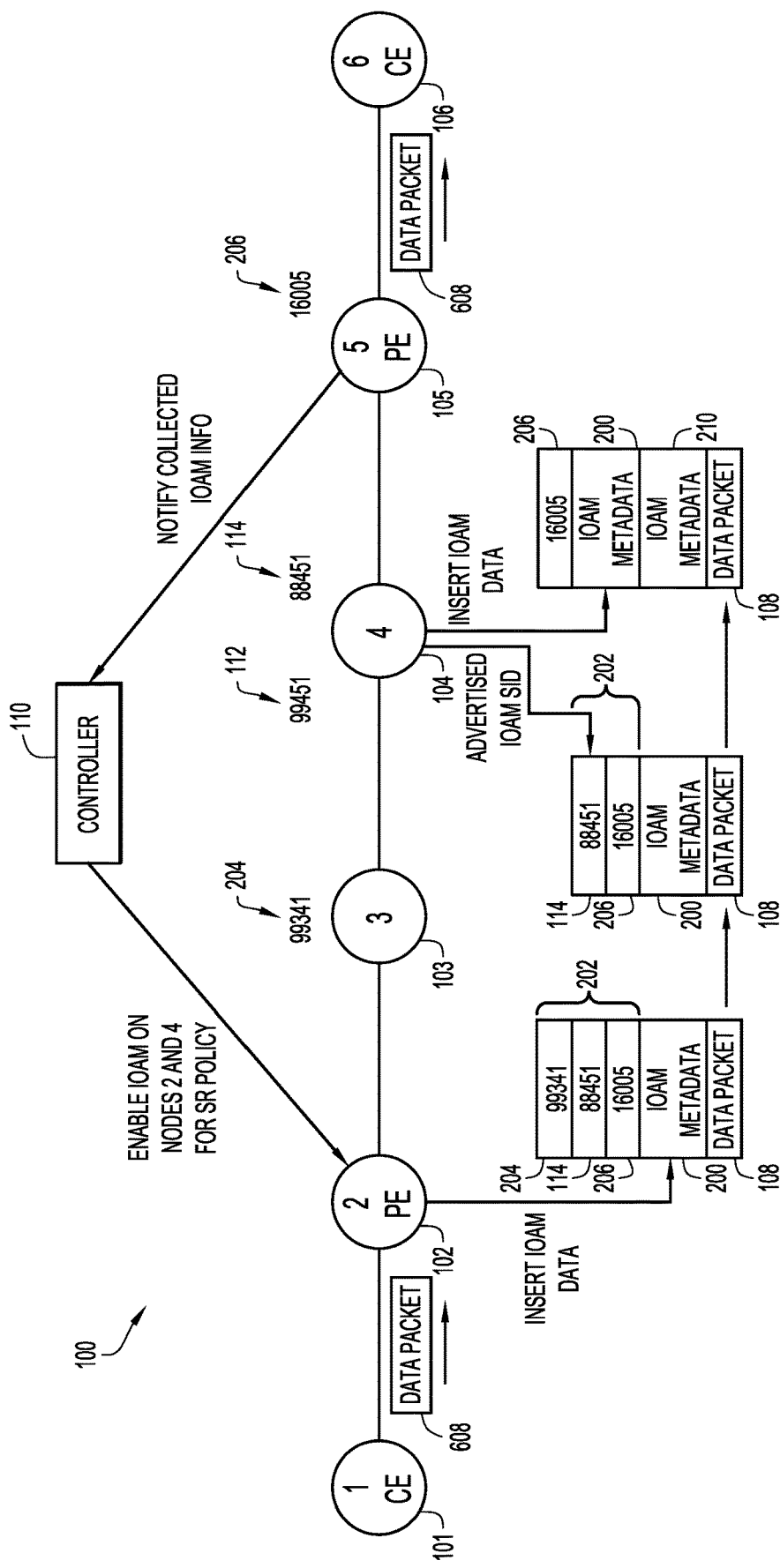
FIG. 2 is a diagram illustrating an example of a targeted "Insert IOAM Data" IOAM function for SR-MPLS policy proof-of-transit, according to an example embodiment.

In an example embodiment, a network controller requests a head-end or ingress node of an SR policy to collect IOAM information from a specific target network node. The head-end or ingress node of the SR policy modifies the segment-list or MPLS label stack to use the IOAM SID for the target network node instead of using the regular SID for the network node. As described above, the IOAM function allows for both "Insert IOAM Data" as well as "Forward and Punt" IOAM functionality. With this configuration, the techniques described herein can be used for both proof-of-transit and performance measurement use cases. Referring now to FIG. 2, a diagram illustrating an example of a targeted "Insert IOAM Data" IOAM function for SR-MPLS policy proof-of-transit is shown according to an example embodiment.

As shown in FIG. 2, network controller 110 may request second network node 102 to insert IOAM data into data packet 108 and obtain IOAM data from fourth network node 104 (i.e., the target network node) as part of an SR policy. According to the techniques of the example embodiments described herein, second network node 102 uses IOAM SID 114 instead of regular SID 112 in an MPLS label stack of data packet 108 for fourth node 104 (i.e., the target node for which the IOAM function is to be implemented).

In this embodiment, second network node 102 implements the SR policy from network controller 110 (e.g., for proof-of-transit) and inserts IOAM data 200 into a header of data packet 108. Additionally, second network node 102 uses IOAM SID 114 for fourth node 104 in an MPLS label stack 202 of data packet 108 to target fourth network node 104 for the IOAM function (i.e., "Insert IOAM Data" in this example). MPLS label stack 202 also includes a SID 204 (99341) for third network node 103 and a SID 206 (16005) for fifth network node 105.

Second network node 102 forwards data packet 108 to the next network node, third network node 103 according to SID 204, which is a regular SID. Accordingly, third network node 103 does not take any IOAM action and forwards data packet 108 to the next network node, fourth network node 104 according to IOAM SID 114 included in MPLS label stack 202.

At fourth network node 104, an IOAM function is implemented as a result of IOAM SID 114 for fourth node 104 being included in MPLS label stack 202 of data packet 108. In this embodiment, the IOAM function associated with IOAM SID 114 is the first IOAM function (i.e., "Insert IOAM Data"). As a result, fourth network node 104 inserts IOAM data 210 into a header of data packet 108 and forwards data packet 108 to the next network node listed in MPLS label stack 202. In this embodiment, the next network node in MPLS label stack 202 is SID 206 for fifth network node 105, where the SR policy terminates and fifth network node 105 provides the collected IOAM data included in the headers of data packet 108 (e.g., IOAM data 200 and IOAM data 210) to network controller 110. In an example embodiment, network controller 110 may use the collected IOAM data for proof-of-transit.

Figure 3:
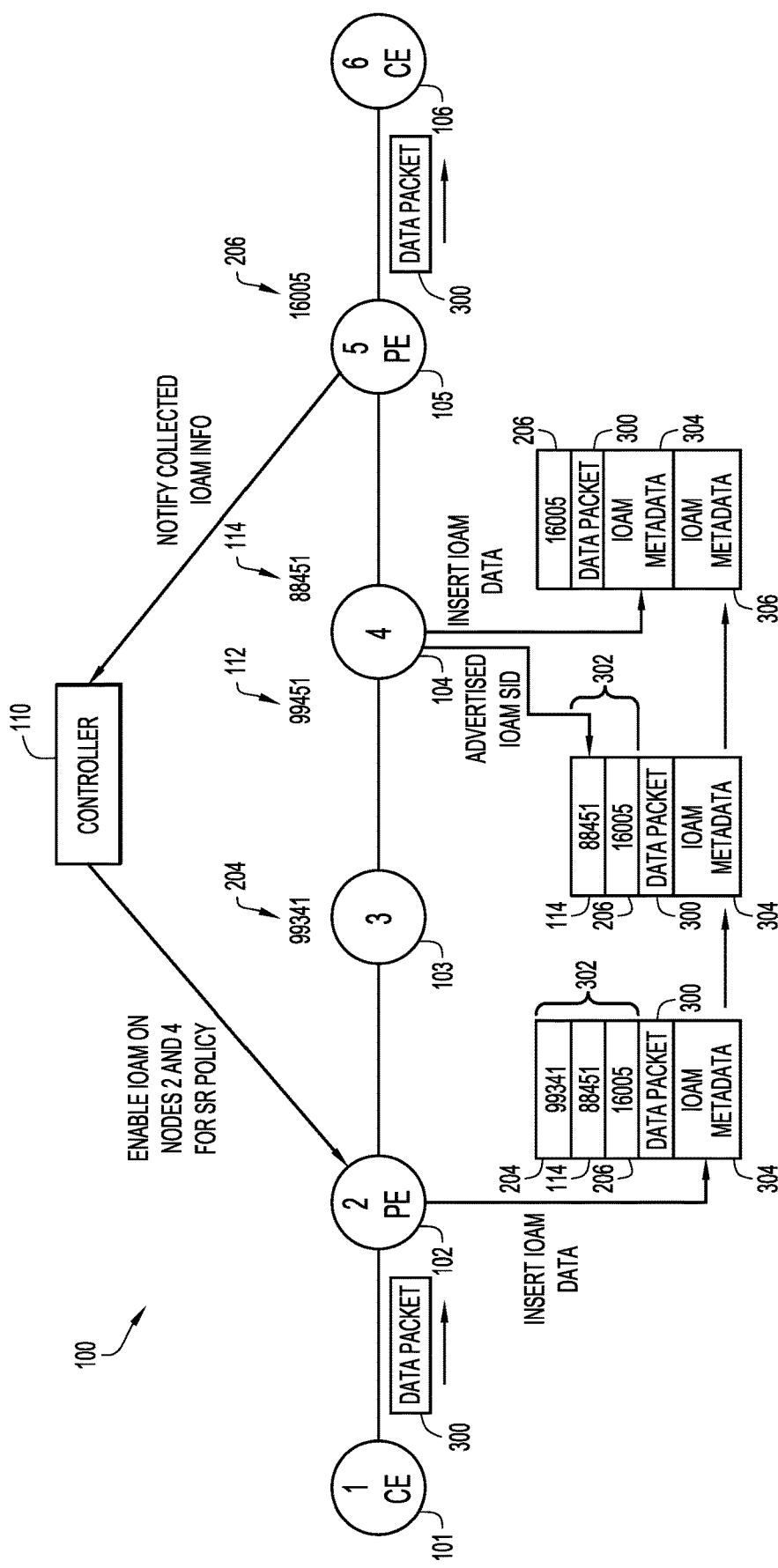
FIG. 3 is a diagram illustrating an example of a targeted "Insert IOAM Data at the End" IOAM function for SR-MPLS policy proof-of-transit, according to an example embodiment.

In the example embodiment of FIG. 2, the IOAM data (e.g., IOAM data 200 and IOAM data 210) is added to data packet 108 before the payload. In other embodiments, however, the IOAM data may be added to the end of the packet, after the payload. Referring now to FIG. 3, a diagram is shown that illustrates an example of a targeted "Insert IOAM Data" IOAM function that adds the IOAM data at the end of the packet, according to an example embodiment, which may be implemented for an SR-MPLS policy proof-of-transit use case.

As shown in FIG. 3, network controller 110 may request second network node 102 to insert IOAM data into a data packet 300 and obtain IOAM data from fourth network node 104 (i.e., the target network node) as part of an SR policy. According to the techniques of the example embodiments described herein, second network node 102 uses IOAM SID 114 instead of regular SID 112 in an MPLS label stack 302 of data packet 300 for fourth node 104 (i.e., the target node for which the IOAM function is to be implemented).

In this embodiment, second network node 102 implements the SR policy from network controller 110 (e.g., for proof-of-transit) and inserts IOAM data 304 into data packet 300 at the end of the packet. Additionally, second network node 102 uses IOAM SID 114 for fourth node 104 in MPLS label stack 302 of data packet 300 to target fourth network node 104 for the IOAM function (i.e., "Insert IOAM Data" in this example). MPLS label stack 302 also includes SID 204 (99341) for third network node 103 and SID 206 (16005) for fifth network node 105.

Second network node 102 forwards data packet 300 to the next network node, third network node 103 according to SID 204, where, as in the previous embodiment, third network node 103 does not take any IOAM action and forwards data packet 300 to fourth network node 104 according to IOAM SID 114 included in MPLS label stack 302.

At fourth network node 104, an IOAM function is implemented as a result of IOAM SID 114 for fourth node 104 being included in MPLS label stack 302 of data packet 300. In this embodiment, the IOAM function associated with IOAM SID 114 is the first IOAM function (i.e., "Insert IOAM Data"), which is the same as FIG. 2, except in this embodiment, IOAM data is added to the end of data packet 300. As a result, fourth network node 104 inserts IOAM data 306 to the end of data packet 300 and forwards data packet 300 to the next network node listed in MPLS label stack 302. In this embodiment, the next network node in MPLS label stack 302 is SID 206 for fifth network node 105, where the SR policy terminates and fifth network node 105 provides the collected IOAM data included at the end of data packet 300 (e.g., IOAM data 304 and IOAM data 306) to network controller 110. In an example embodiment, network controller 110 may use the collected IOAM data for proof-of-transit.

Figure 4:
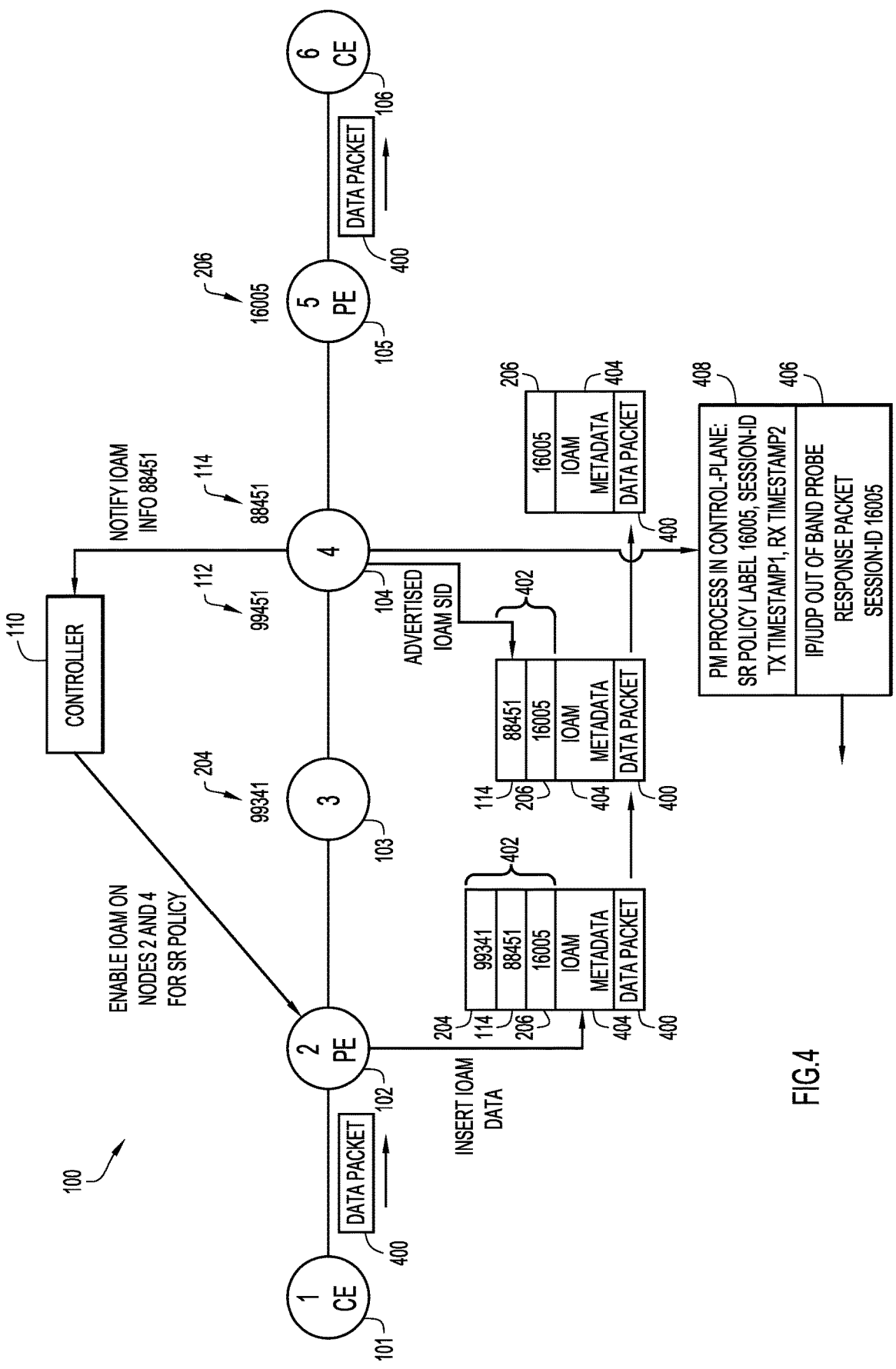
FIG. 4 is a diagram illustrating an example of a targeted "Forward and Punt" IOAM function for SR-MPLS policy performance measurement, according to an example embodiment.

Referring now to FIG. 4, a diagram illustrating an example of a targeted "Forward and Punt" IOAM function for SR-MPLS policy performance measurement is shown according to an example embodiment. As shown in FIG. 4, network controller 110 may request second network node 102 to insert IOAM data into a data packet 400 and obtain IOAM data from fourth network node 104 (i.e., the target network node) as part of an SR policy. According to the techniques of the example embodiments described herein, second network node 102 uses IOAM SID 114 instead of regular SID 112 in an MPLS label stack 402 of data packet 400 for fourth node 104 (i.e., the target node for which the IOAM function is to be implemented).

In this embodiment, second network node 102 implements the SR policy from network controller 110 (e.g., for performance measurement) and inserts IOAM data 404 into a header of data packet 400. Additionally, second network node 102 uses IOAM SID 114 for fourth node 104 in MPLS label stack 402 of data packet 400 to target fourth network node 104 for the IOAM function (i.e., "Forward and Punt" in this example). MPLS label stack 402 also includes SID 204 (99341) for third network node 103 and SID 206 (16005) for fifth network node 105.

Second network node 102 forwards data packet 400 to the next network node, third network node 103 according to SID 204, which is a regular SID. Accordingly, third network node 103 does not take any IOAM action and forwards data packet 400 to the next network node, fourth network node 104 according to IOAM SID 114 included in MPLS label stack 402.

At fourth network node 104, an IOAM function is implemented as a result of IOAM SID 114 for fourth node 104 being included in MPLS label stack 402 of data packet 400. In this embodiment, the IOAM function associated with IOAM SID 114 is the second IOAM function (i.e., "Forward and Punt"). As a result, fourth network node 104 generates an out-of-band probe response packet 406 that includes IOAM data 408 (e.g., transmit (TX) and receive (RX) timestamps) as part of the IOAM function that is generated based on IOAM SID 114. Out-of-band probe response packet 406 with IOAM data 408 may be sent to a designated network node, for example, second network node 102 where the SR policy is configured (i.e., the ingress node of the SR policy). In an example embodiment, the collected IOAM data from probe response packet 406 may be used for performance delay/loss measurement.

In another embodiment, a network node may "process" the IOAM data present in the header of the data packet instead of, or in addition to, inserting new IOAM data in the header according to the various techniques described herein. An example of such processing of IOAM data may include calculating a delay value based on when the packet was received by the network node and a comparison with a timestamp included in the IOAM data.

In addition, as part of the IOAM function, fourth network node 104 also forwards data packet 400 to the next network node listed in MPLS label stack 402. In this embodiment, the next network node in MPLS label stack 402 is SID 206 for fifth network node 105.

Figure 5:
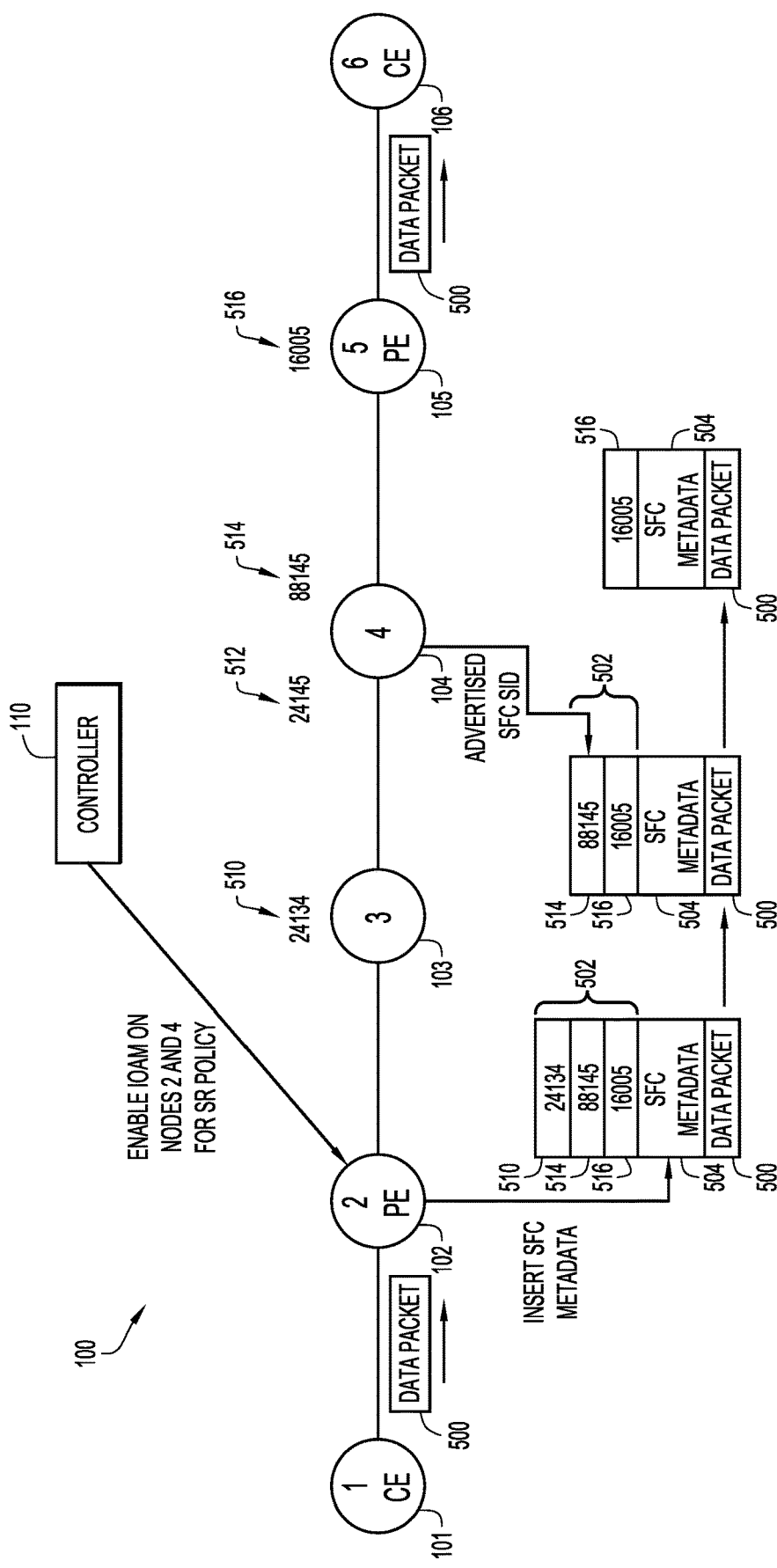
FIG. 5 is a diagram illustrating an example of an IOAM function for a service function chain, according to an example embodiment.

The techniques of the present embodiments may also be applied to service function chains (SFC) in a network to collect SFC metadata associated with the service function chain. The SFC metadata for service function chaining is defined in IETF publication "An MPLS-Based Forwarding Plane for Service Function Chaining", available at: datatracker.ietf.org/doc/draft-ietf-mpls-sfc. FIG. 5 is a diagram illustrating an example of an SFC metadata function for a service function chain in network 100, according to an example embodiment. In this embodiment, one or more of the plurality of network nodes 101, 102, 103, 104, 105, 106 may be associated with service functions for a service function chain. As with the previous embodiments, in this embodiment, a network node may advertise a regular SID associated with a network node and an SFC SID associated with an SFC metadata function to be implemented by the node.

As shown in FIG. 5, network controller 110 may request second network node 102 to insert SFC metadata into a data packet 500 and obtain SFC metadata from a service function to be implemented at fourth network node 104 (i.e., the target network node) as part of an SR policy. According to the techniques of the example embodiments described herein, second network node 102 uses an SFC SID 514 instead of a regular SID 512 in an MPLS label stack 502 of data packet 500 for the fourth node 104 (i.e., the target node for which the SFC metadata function is to be implemented).

In this embodiment, second network node 102 implements the SR policy from network controller 110 and, as part of the service function performed at second network node 102, inserts SFC metadata 504 into a header of data packet 500. Additionally, second network node 102 uses SFC SID 514 for fourth node 104 in MPLS label stack 502 of data packet 500 to target fourth network node 104 for the SFC metadata function. MPLS label stack 502 also includes a SID 510 (24134) for third network node 103 and a SID 516 (16005) for fifth network node 105.

Second network node 102 forwards data packet 500 to the next network node, third network node 103 according to SID 510, which is a regular SID. Accordingly, third network node 103 implements a service function on data packet 500 without taking any SFC metadata action and forwards data packet 500 to the next network node, fourth network node 104 according to SFC SID 514 included in MPLS label stack 502.

At fourth network node 104, an SFC metadata function is implemented as a result of SFC SID 514 for fourth node 104 being included in MPLS label stack 502 of data packet 500. In this embodiment, the SFC metadata function associated with SFC SID 514 inserts additional information into SFC metadata 504 in the header of data packet 500. Fourth network node 104 forwards data packet 500 to the next network node listed in MPLS label stack 502 to implement the next service function in the service function chain. In this embodiment, the next network node in MPLS label stack 502 is SID 516 for fifth network node 105. With this configuration, the techniques of the present embodiments may be used for collection of SFC metadata by using an SFC SID to selectively target collection of the SFC metadata at a specific service function of a target network node.

The techniques and embodiments described herein with reference to implementing an IOAM function using an IOAM SID are equally applicable to implementing SFC metadata collection and/or processing using an SFC SID.

Figure 6:
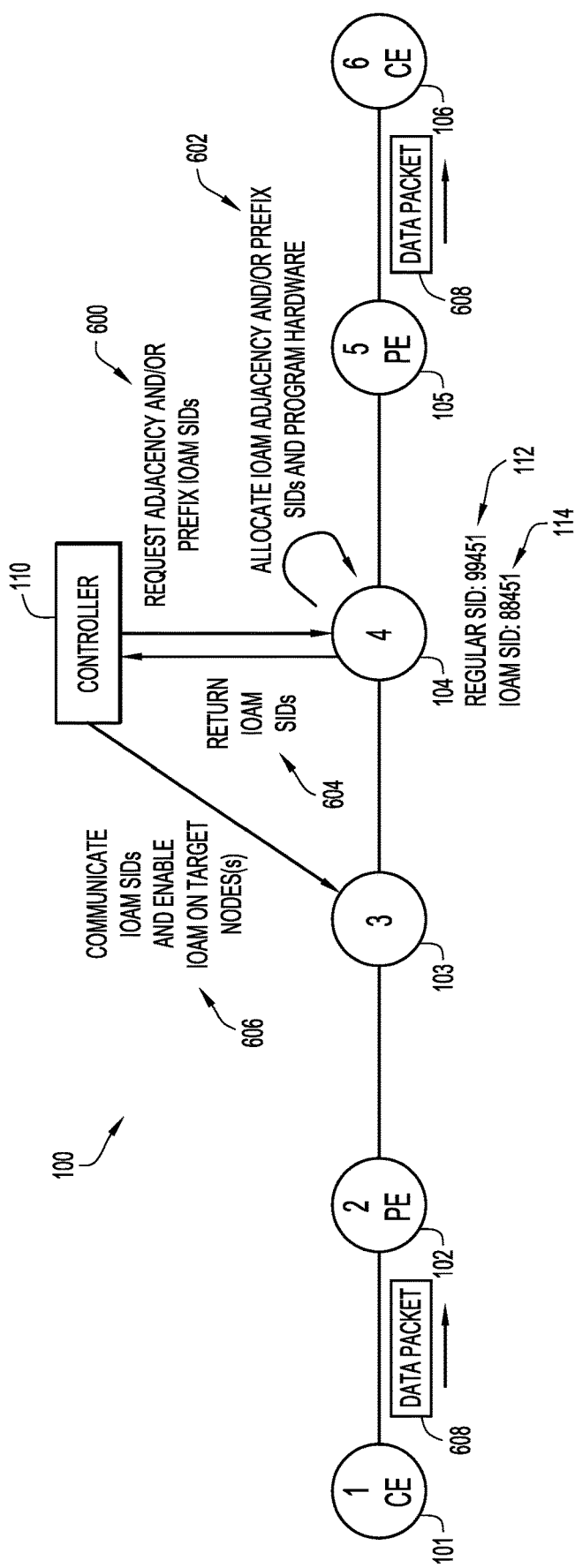
FIG. 6 is a diagram illustrating a target network node in an SR-MPLS network allocating an IOAM function, according to an example embodiment.

FIG. 6 is a diagram illustrating a target network node in SR-MPLS network 100 allocating an IOAM function, according to an example embodiment. In the example embodiments described above, allocation of IOAM SIDs, including prefix SIDs and/or adjacency SIDs, has been implemented by a network controller (e.g., network controller 110). In other embodiments, allocation of IOAM SIDs may be implemented by a target network node in the network.

As shown in FIG. 6, network 100 includes the plurality of network nodes 101, 102, 103, 104, 105, 106 and network controller 110, as described in the previous embodiments. In this embodiment, a target network node allocates IOAM SIDs, rather than network controller 110. For example, network controller 110 may send a message 600 requesting an adjacency and/or prefix IOAM SID to fourth network node 104 (i.e., the target network node for implementing an IOAM function). In response, fourth network node 104 may perform an allocation operation 602 where one or more IOAM SIDs (e.g., adjacency and/or prefix) are allocated at fourth network node 104 and the associated hardware is programed to perform the IOAM function associated with the IOAM SID. In this embodiment, fourth network node 104 allocates regular SID 112 (99451) and IOAM SID 114 (88451) associated with an IOAM function.

For example, network controller 110 may send a message 600 requesting an adjacency and/or prefix IOAM SID to fourth network node 104 (i.e., the target network node for implementing an IOAM function). In response, fourth network node 104 may perform an allocation operation 602 where one or more IOAM SIDs (e.g., adjacency and/or prefix) are allocated at fourth network node 104 and the associated hardware is programed to perform the IOAM function associated with the IOAM SID. In this embodiment, fourth network node 104 allocates regular SID 112 (99451) and IOAM SID 114 (88451) associated with an IOAM function.

In other embodiments, the IOAM SIDs may be allocated by a network controller (e.g., network controller 110) from SRGB and provided to one or more network nodes (e.g., network node 104) to program in its hardware.

After allocating IOAM SID 114 and programming the hardware, fourth network node 104 sends a response message 604 to network controller 110 that returns the one or more IOAM SIDs (e.g., IOAM SID 114 in this example). In this embodiment, network controller 110 communicates the IOAM SIDs allocated by the target network node (e.g., IOAM SID 114 associated with fourth network node 104) via a message 606. Additionally, message 606 from network controller 110 may also include instructions to enable an IOAM function on one or more network nodes of the plurality of network nodes 101, 102, 103, 104, 105, 106 (e.g., as part of an SR policy, as described above).

With this configuration, a data packet 608 may traverse through network 100 and an IOAM function may be implemented by one or more of the plurality of network nodes 101, 102, 103, 104, 105, 106 by including an IOAM SID in the MPLS label stack of data packet 608 for each network node that is targeted for an IOAM function. For example, in this embodiment, an IOAM function may be implemented by fourth network node 104 by including IOAM SID 114 in the MPLS label stack of data packet 608.

Figure 7:
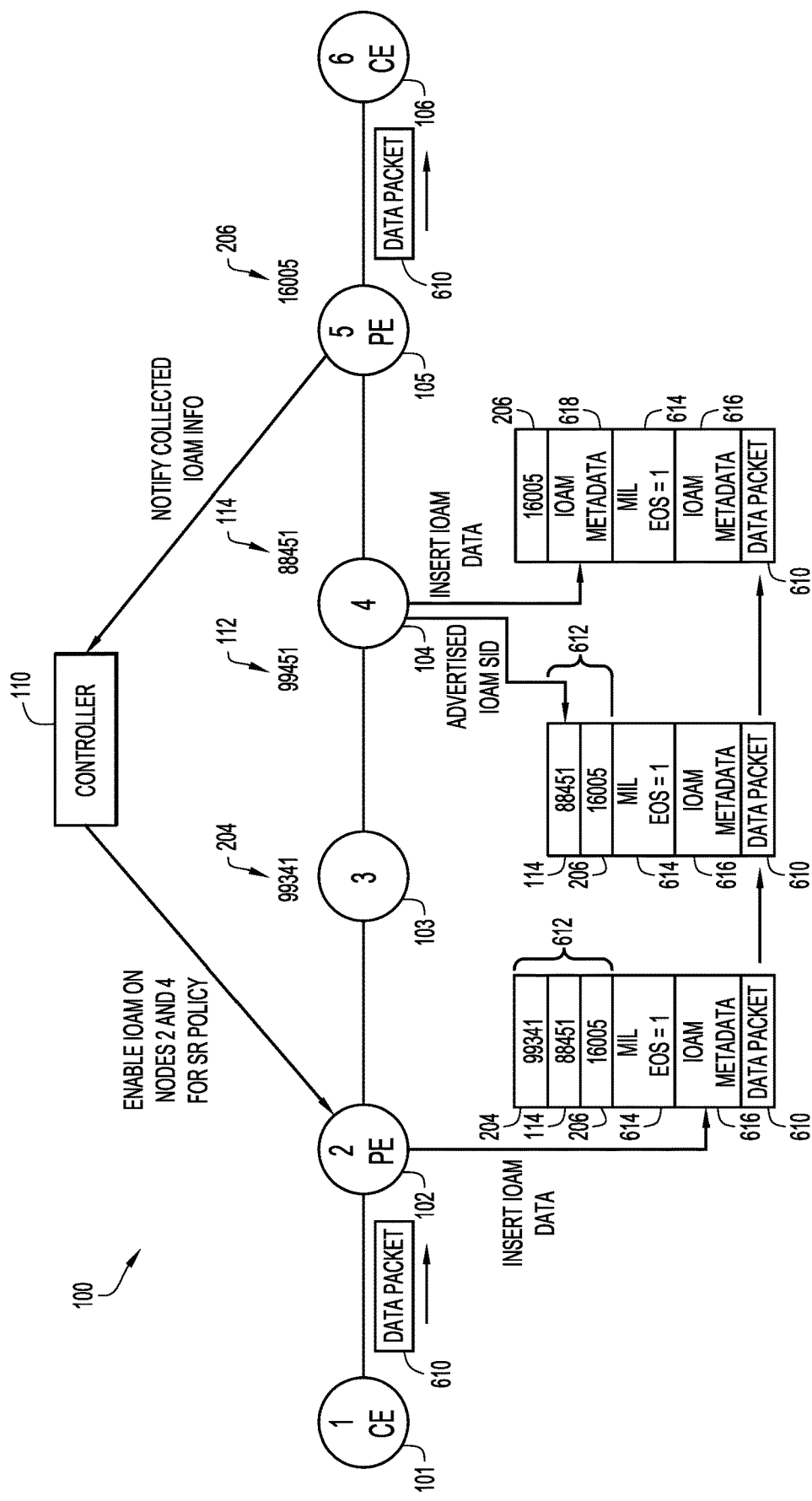
FIG. 7 is a diagram illustrating an example of a Metadata Indicator Label (MIL) for implementing an IOAM function, according to an example embodiment.

In some embodiments, an IOAM SID may be used to hint about the presence of IOAM data in a data packet. In such embodiments, a Metadata Indicator Label at the bottom of the label stack (with EOS=1) is used to indicate which IOAM function is enabled, as described above. Referring now to FIG. 7, a diagram illustrating an example of a Metadata Indicator Label (MIL) for implementing an IOAM function is shown according to an example embodiment.

In this embodiment, network 100 includes the plurality of network nodes 101, 102, 103, 104, 105, 106 and network controller 110, as described in the previous embodiments. In this embodiment, a data packet 610 includes an MPLS label stack 612 that includes SID 204 for third network node 103 (99341), IOAM SID 114 for fourth network node 104 (88451), and SID 206 for fifth network node 105 (16005). Additionally, in this embodiment, data packet 610 includes MIL 616 with EOS flag set to 1. The presence of MIL 616 with EOS flag set to 1 indicates to the network nodes that at least one SID in MPLS label stack 612 is an IOAM SID for implementing an IOAM function (e.g., IOAM SID 114, in this embodiment).

As shown in FIG. 7, data packet 610 includes IOAM data 616 collected by second network node 102. Second network node 102 forwards data packet 610 to the next network node, third network node 103 according to SID 204, which is a regular SID. Accordingly, third network node 103 does not take any IOAM action and forwards data packet 610 to the next network node, fourth network node 104 according to IOAM SID 114 included in MPLS label stack 612.

At fourth network node 104, an IOAM function is implemented as a result of IOAM SID 114 for fourth node 104 being included in MPLS label stack 612 of data packet 610. In this embodiment, the IOAM function associated with IOAM SID 114 is the first IOAM function (i.e., "Insert IOAM Data"). As a result, fourth network node 104 inserts IOAM data 618 into the headers of data packet 610 as part of the IOAM function that is generated based on IOAM SID 114. In addition, as part of the IOAM function, fourth network node 104 also forwards data packet 610 to the next network node listed in MPLS label stack 612. In this embodiment, the next network node in MPLS label stack 612 is SID 206 for fifth network node 105.

In another embodiment, an IOAM SID (e.g., IOAM SID 114) may also act as a MTh to indicate an IOAM function, such as, "end-to-end IOAM", "Hop-by-hop IOAM", or "Hop-by-hop recording with end-to-end IOAM", etc., in addition to hinting at the presence of the IOAM data. In this case a separate MIL at the bottom of the label stack (with EOS=1) on the MPLS header metadata may not be required.

Figure 8:
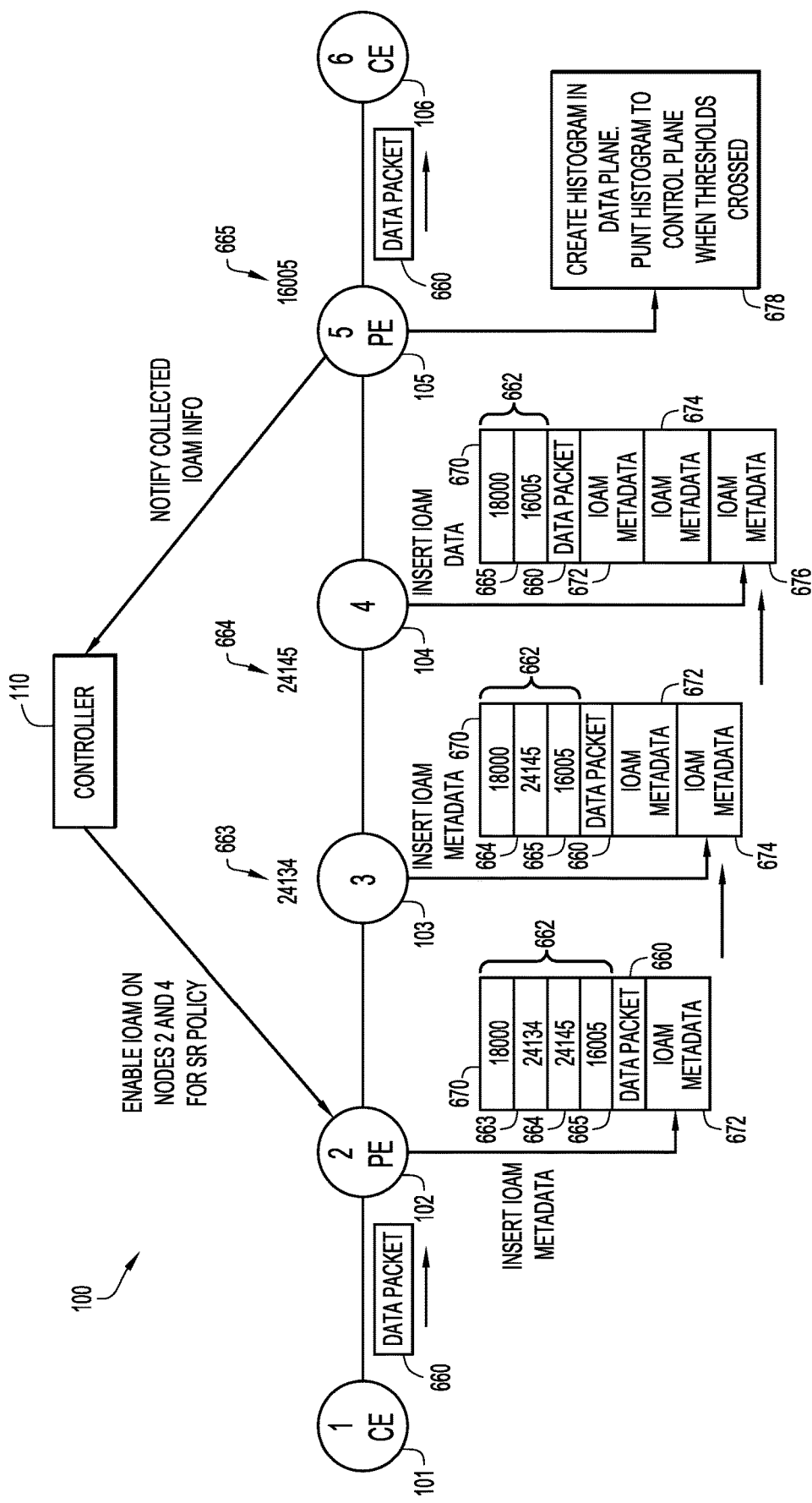
FIG. 8 is a diagram illustrating an example of a hint label using a global SID to enable an IOAM function on a hop-by-hop basis, according to an example embodiment.
Figure 9:
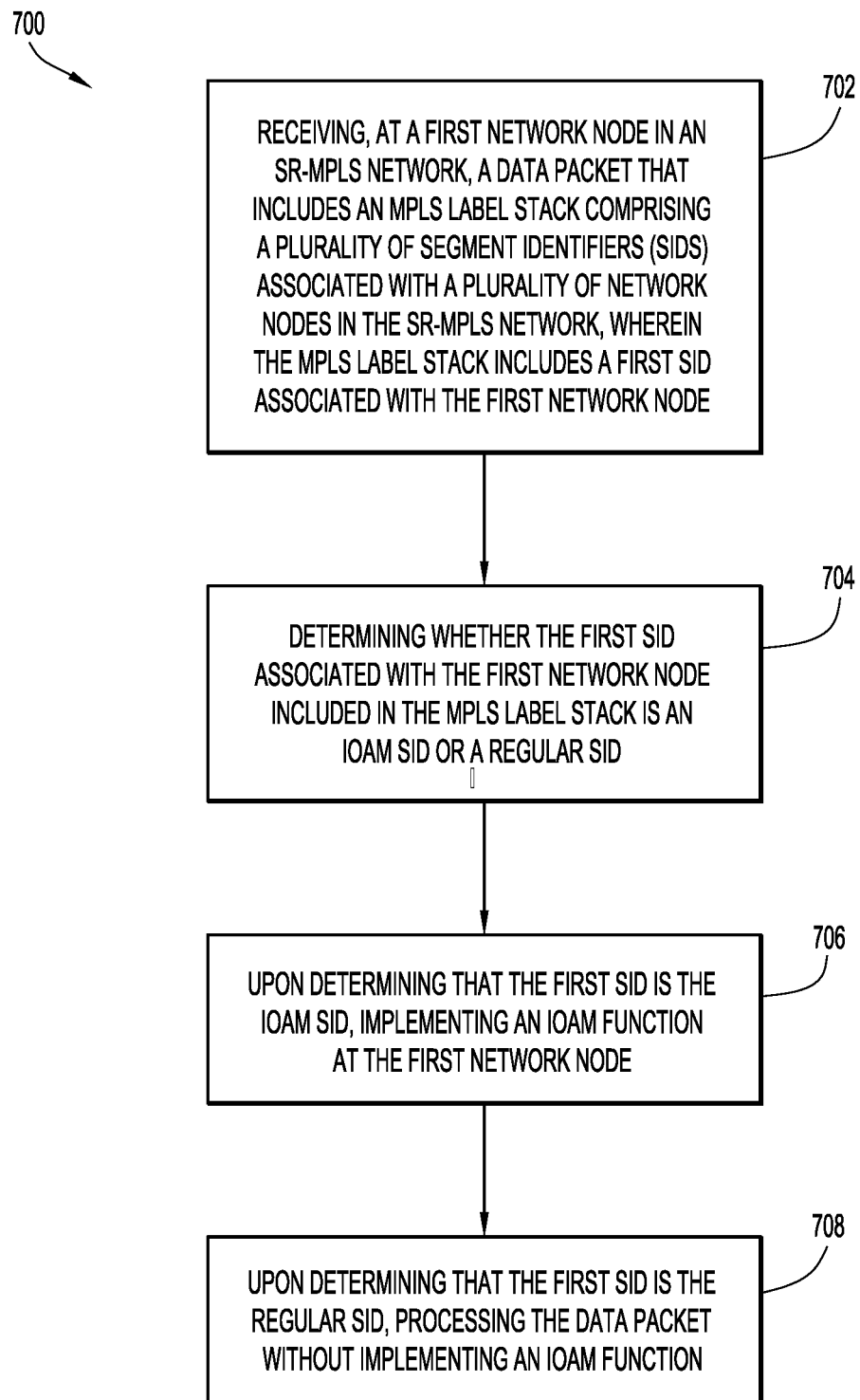
FIG. 9 is a flowchart of a method for implementing an IOAM function on a network node, according to an example embodiment.

In another embodiment, an IOAM SID, a Special/Reserved Hint Label, or Network Programming Hint Label (e.g., a global SID) from SRGB allocated by a network controller may be used at the top of an MPLS label stack with Copy-In-to-Out behavior. Referring now to FIG. 8, a diagram illustrating an example of a hint label using a global SID to enable an IOAM function on a hop-by-hop basis is shown according to an example embodiment.

As shown in FIG. 8, network 100 includes the plurality of network nodes 101, 102, 103, 104, 105, 106 and network controller 110, as described in the previous embodiments. In this embodiment, a data packet 660 includes an MPLS label stack 662 that includes a SID 663 for third network node 103 (24134), a SID 664 for fourth network node 104 (24145), and a SID 665 for fifth network node 105 (16005). Additionally, in this embodiment, data packet 660 includes a hint label 670 using a global SID (18000) at the top of MPLS label stack 662. The presence of hint label 670 using global SID (18000) at the top of MPLS label stack 662 indicates to each of the network nodes that an IOAM function is to be implemented at each network node on a hop-by-hop basis.

In this embodiment, upon receiving data packet 660 with hint label 670 using a global SID (18000) at the top of MPLS label stack 662, second network node 102 inserts first IOAM data 672 at the end of data packet 660. Similarly, at the next network node, third network node 103, also implements the IOAM function to insert second IOAM data 674 at the end of data packet 660 after first IOAM data 672. This process may continue on a hop-by-hop basis for each of the remaining network nodes as part of the SR policy. In this case, fourth network node 104 receives data packet 660 with hint label 670 using a global SID (18000) at the top of MPLS label stack 662, and inserts third IOAM data 676 at the end of data packet 660 after first IOAM data 672 and second IOAM data 674.

In this embodiment, when data packet 660 is received at a network node, the hint label 670 present using a global SID (18000) at the top of MPLS label stack 662 is used by the node to check for an IOAM function, whereas the next label in the label stack 662 (which is a regular adjacency or prefix SID) is used to forward data packet 660 to the next node. The hint label 670 (i.e., global IOAM SID 18000) is restored at the top of MPLS label stack 662 before forwarding data packet 660 to the next hop. In these embodiments, hint label 670 is not added to data packets that do not have an IOAM function enabled, thereby resulting in less processing overhead on network nodes.

Referring again to FIG. 8, in this embodiment, fifth network node 105 may receive data packet 660 that includes a plurality of IOAM data from one or more network nodes (e.g., first IOAM data 672, second IOAM data 674, and third IOAM data 676). Fifth network node 105 may compute for example, an end-to-end delay based on the collected IOAM data. The determined delay may be saved into a histogram 678 for the SR Policy using the context in the Metadata (i.e., Color, Endpoint, Ingress Node ID, Flow-ID, etc.). The histogram 678 may be computed in hardware and no data packets need to be punted to the control plane.

For example, fifth network node can maintain counters per each bin (e.g., 10 msec) of delay values (e.g., RX-timestamp minus TX-timestamp). Fifth network node 105 may create, for example, three such counters (e.g., corresponding to good delay values, ok delay values, and bad delay values). Fifth network node 105 can then compare the counters with some threshold values. When a threshold is crossed by counters, histogram data 678 from hardware may be punted to the control plane. Fifth network node 105 then may export the histogram data 678 via telemetry to a network controller (e.g., network controller 110) for further processing and analytics.

FIG. 7 is a flowchart of a method 700 for implementing an IOAM function on a network node, according to an example embodiment. In some embodiments, method 700 may be implemented by a network node. For example, in one embodiment, method 700 may be implemented by fourth network node 104, described above. In other embodiments, method 700 may be implemented by more than one network node in a network.

In some embodiments, prior to performing operations of method 700, one or more IOAM SIDs may be allocated at one or more target network nodes. For example, IOAM SIDs may be allocated by a network controller (e.g., network controller 110) or may be allocated by a target network node itself (e.g., fourth network node 104 as described in reference to FIG. 6). Additionally, allocation of the IOAM SIDs may also include updating programming on the hardware of the network nodes and determining an IOAM function to be implemented by a target network node when receiving a packet using its allocated IOAM Referring to FIG. 7, in this embodiment, method 700 may begin at an operation 702. At operation 702, a first network node in an SR-MPLS network receives a data packet that includes an MPLS label stack comprising a plurality of segment identifiers (SIDs) associated with a plurality of network nodes in the SR-MPLS network. The MPLS label stack includes a first SID associated with the first network node. For example, as shown in FIG. 2, data packet 108 includes MPLS label stack 202 that includes SIDs for third network node 103 (e.g., SID 204 (99341)), fourth network node 104 (e.g., IOAM SID 114 (88451)), and fifth network node 105 (e.g., SID 206 (16005)).

Next, method 700 includes an operation 704, where whether the first SID associated with the first network node included in the MPLS label stack is an IOAM SID or a regular SID. For example, as shown in FIG. 2, fourth network node 104 is associated with both IOAM SID 114 and regular SID 112. At operation 704, fourth network node 104 determines whether the SID included in MPLS label stack 202 of data packet 200 is IOAM SID 114 or regular SID 112.

Upon determining at operation 704 that the first SID is the IOAM SID, method 700 proceeds to an operation 706. At operation 706, an IOAM function is implemented at the first network node. As described above, an IOAM function may include at least a first IOAM function (e.g., "Insert IOAM Data") or a second IOAM function (e.g. "Forward and Punt"). For example, as shown in FIG. 2, upon determining that IOAM SID 114 is included in MPLS label stack 202 of data packet 200, fourth network node 104 may implement the "Insert IOAM Data" IOAM function. In another example, as shown in FIG. 4, upon determining that IOAM SID 114 is included in MPLS label stack 402 of data packet 400, fourth network node 104 may implement the "Forward and Punt" IOAM function.

Upon determining at operation 704 that the first SID is the regular SID, method 700 proceeds to an operation 708. At operation 708, the data packet is processed at the first network node without implementing an IOAM function. For example, as shown in FIG. 2, third network node 103 receives data packet 200 with MPLS label stack 202 that includes SID 204 associated with third network node 103. In this example, SID 204 is a regular SID (i.e., is not associated with an IOAM function), as a result, third network node 103 processes data packet 200 and forwards it to the next network node associated with the next SID in the MPLS label stack. For example, third network node 103 forwards data packet 200 to fourth network node 104 based on IOAM SID 114 being the next SID listed in MPLS label stack 202.

Upon completion of operation 706 or operation 708, method 700 may end with respect to the first network node.

Where a network includes a plurality of network nodes, method 700 may be implemented again at the next network node in the path of the data packet. Additionally, method 700 may be implemented for each data packet that is sent through a network. With this arrangement, an IOAM mechanism that uses a SR-MPLS IOAM SID is provided that can selectively collect IOAM data from "target" network nodes along a data packet path.

Flag to Advertise IOAM Adjacency SID

In some embodiments, advertising the IOAM adjacency SID may be implemented using IETF publication "IS-IS Extensions for Segment Routing", available at tools.ietf.org/html/draft-ietf-isis-segment-routing-extensions-22. In particular, section 2.2.1 of the publication describes an adjacency SID (Adj-SID) Sub-TLV, and IS-IS Extension defines a B flag to indicate that the adjacency SID is protected. A new flag may be defined to indicate that the adjacency SID enables IOAM functionality and/or SFC metadata functionality, as described above.

Figure 10:
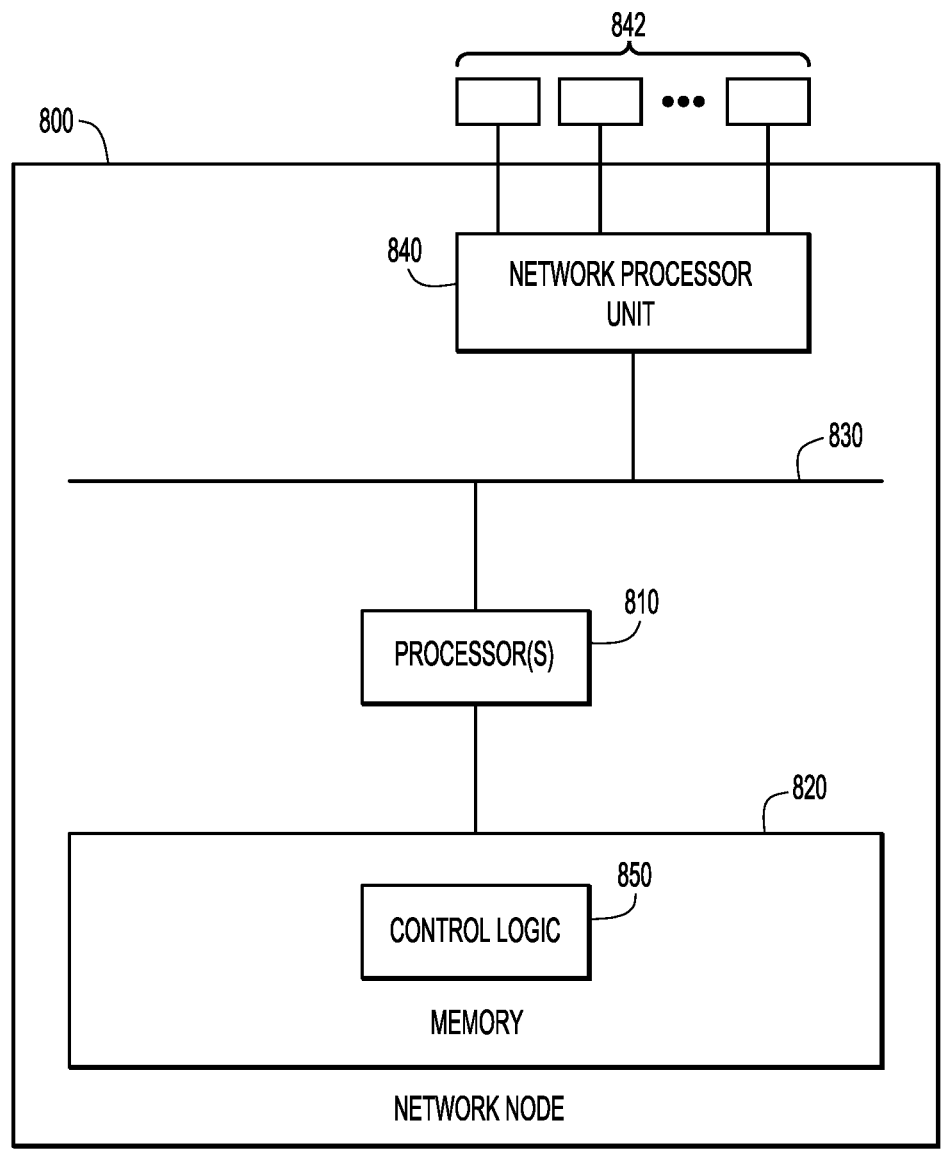
FIG. 10 is a block diagram of a network node configured to perform the operations described herein, according to an example embodiment.

Reference is now made to FIG. 10. FIG. 10 illustrates a block diagram of a representative network node 800 configured to perform the operations described above and depicted in connection with FIGS. 1-9. For example, representative network node 800 may be fourth network node 104, described above in reference to FIGS. 1-9 above. As shown in FIG. 10, network node 800 includes one or more control processors 810, memory 820, a bus 830 and a network processor unit 840. The control processor 810 may be a microprocessor or microcontroller. The network processor unit 840 may include one or more Application Specific Integrated Circuits (ASICs), linecards, etc., and facilitates network communications between the node 800 and other network nodes. Moreover, the network processor unit 840 may be configured to encapsulate a packet to include an IOAM header, and to decapsulate a packet that includes an IOAM header, and to perform the operations described above that would be performed by hardware.

There are a plurality of network ports 842 at which network node 800 receives packets and from which network node 800 sends packets into a network (e.g., network 100). The processor 810 executes instructions associated with software stored in memory 820. Specifically, the memory 820 stores instructions for control logic 850 that, when executed by the processor 810, causes the processor 810 to perform various operations on behalf of network node 800 as described herein. The memory 820 also stores configuration information 860 received from a network controller (e.g., network controller 110) to configure the network node according to desired network functions. It should be noted that in some embodiments, the control logic 850 may be implemented in the form of firmware implemented by one or more ASICs as part of the network processor unit 840.

The memory 820 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform certain network node operations described herein. For example, instructions for implementing one or more IOAM functions, as described above, may be stored in memory 820.

Figure 11:
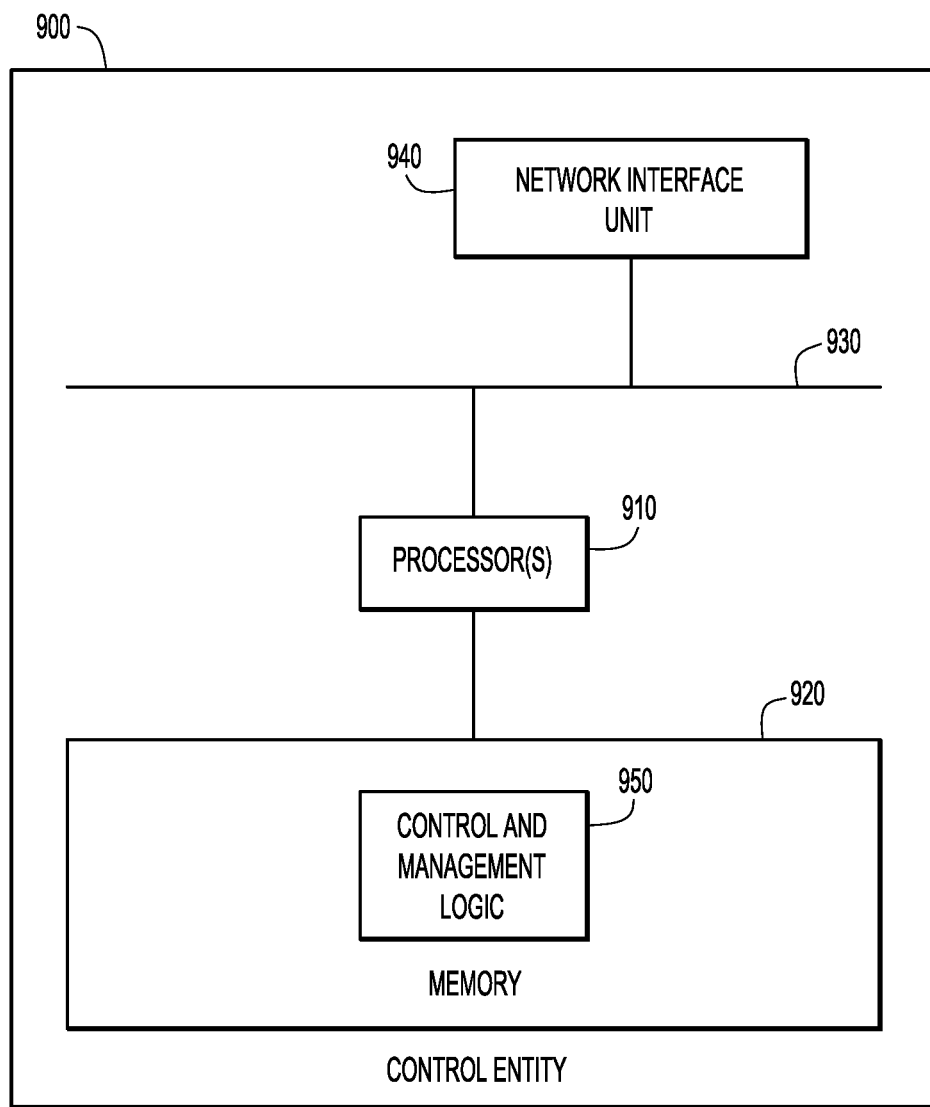
FIG. 11 is a block diagram of a network controller configured to participate in the mechanisms presented herein, according to an example embodiment.

Reference is now made to FIG. 11. FIG. 11 illustrates a block diagram of a computing/control entity 900 that may perform the functions of a network controller (e.g., network controller 110) shown in FIGS. 1-9 above. The computing/control entity 900 includes one or more processors 910, memory 920, a bus 930 and a network interface unit 940, such as one or more network interface cards that enable network connectivity. The memory 920 stores instructions for control and management logic 950, that when executed by the processor 910, cause the processor to perform the software defined network controller operations described herein.

The memory 910 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 920 may comprise one or more tangible (non-transitory) computer readable storage media (e.g., a memory device) encoded with software comprising computer executable instructions and when the software is executed (by the processor 910) it is operable to perform the network controller operations described herein. For example, instructions for implementing allocation of IOAM SIDs associated with an IOAM function at one or more target network nodes and/or instructions for an SR policy may be stored in memory 920.

SR Policy—SR-MPLS and EVPN

In some embodiments, an SR Policy may be created for SR-MPLS in an Ethernet virtual private network (EVPN). Although, in the example embodiments above, packet forwarding examples are shown with an SR-MPLS header, the techniques described herein apply equally to the EVPN network.

SR Policy—SR-MPLS and RSVP-TE

IOAM functionality according to the example embodiments described herein may also be enabled in Resource Reservation Protocol (RSVP) based Traffic Engineering (TE) networks. Although, in the example embodiments above, packet forwarding examples are shown with an SR-MPLS header, the techniques described herein apply equally to the RSVP-TE networks. The techniques work for any SR-MPLS label imposition use-case in the network. In case of RSVP-TE LSPs, a head-end node may request via attribute-object flag in the RSVP Path message to request IOAM/SFC SID from each network node. In this case, a network node signal can the IOAM/SFC SID instead of signaling regular MPLS label in the RSVP Reservation message upstream. These SIDs are then used by the data packets carried by the RSVP-TE LSPs. If a network node signaled an IOAM/SFC SID, it would program the local forwarding for required IOAM/SFC handling. If a network node does not support IOAM/SFC, it would simply ignore the RSVP signaling request and also continue to process data packets without IOAM/SFC functions (i.e., it is backwards compatible).

An advantage of the example embodiments is that a network node can program an SR-MPLS IOAM SID in forwarding in hardware ahead of time, thereby optimizing the hardware processing for IOAM data collection. The techniques according to the example embodiments are backwards compatible with network nodes that do not support an IOAM SID. The IOAM mechanism described herein is efficient to implement in hardware and it does not require lookup for a special label.

In summary, an IOAM mechanism is defined using an SR-MPLS IOAM SID that can selectively collect IOAM data from "target" nodes along the data packet path. The head-end of the SR Policy uses the IOAM SID instead of regular SID on the label stack of the data packet for the targeted nodes. The IOAM mechanism allows both "Insert IOAM Data" as well as "Forward and Punt" with a timestamped copy of the packet IOAM functionalities. The IOAM mechanism described herein can be used for both proof-of-transit and performance measurement use-cases.

The IOAM mechanism according to the example embodiments is easy to implement in hardware as an SR-MPLS IOAM SID can be programmed ahead of time to provide the required IOAM functionality. As only targeted nodes participate in the IOAM, it does not affect performance of the data flow being monitored.

According to the example embodiments, an IOAM SID (or SFC SID) provides programmable functionality on a targeted transit network node, as it can be programmed based on local provisioning on that node to provide certain IOAM or SFC functions for the advertised SID.

In summary, a method for providing in-situ operation, administration, and maintenance (IOAM) data in a Segment Routing-Multiprotocol Label Switching (SR-MPLS) network is provided comprising: receiving, at a first network node in the SR-MPLS network, a data packet that includes an MPLS label stack comprising a plurality of segment identifiers (SIDs) associated with a plurality of network nodes in the SR-MPLS network, wherein the MPLS label stack includes a first SID associated with the first network node; determining whether the first SID associated with the first network node included in the MPLS label stack is an IOAM SID or a regular SID; upon determining that the first SID is the IOAM SID, implementing an IOAM function at the first network node; and upon determining that the first SID is the regular SID, processing the data packet without implementing an IOAM function.

In another form, one or more non-transitory computer readable storage media encoded with instructions are provided that, when executed by a processor of a first network node in a Segment Routing-Multiprotocol Label Switching (SR-MPLS) network, cause the processor to: receive a data packet that includes an MPLS label stack comprising a plurality of segment identifiers (SIDs) associated with a plurality of network nodes in the SR-MPLS network, wherein the MPLS label stack includes a first SID associated with the first network node; determine whether the first SID associated with the first network node included in the MPLS label stack is an in-situ operation, administration, and maintenance (IOAM) SID or a regular SID; upon determining that the first SID is the IOAM SID, implement an IOAM function at the first network node; and upon determining that the first SID is the regular SID, process the data packet without implementing an IOAM function.

In addition, an apparatus is provided comprising: a plurality of network ports configured to receive inbound packets and to send outbound packets in a Segment Routing-Multiprotocol Label Switching (SR-MPLS) network; a memory; a processor coupled to the memory and to the plurality of network ports, wherein the processor is configured to: receive a data packet that includes an MPLS label stack comprising a plurality of segment identifiers (SIDs) associated with a plurality of network nodes in the SR-MPLS network, wherein the MPLS label stack includes a first SID associated with the apparatus; determine whether the first SID associated with the apparatus included in the MPLS label stack is an in-situ operation, administration, and maintenance (IOAM) SID or a regular SID; upon determining that the first SID is the IOAM SID, implement an IOAM function; and upon determining that the first SID is the regular SID, process the data packet without implementing an IOAM function.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving a data packet that includes a Multiprotocol Label Switching (MPLS) label stack including an MPLS label that prompts a first network node in an MPLS network to implement one or more in-situ operation, administration, and maintenance (IOAM) functions;
   determining that the MPLS label stack includes the MPLS label; and
   upon determining that the MPLS label stack includes the MPLS label, implementing the one or more IOAM functions at the first network node, wherein the one or more IOAM functions include collecting IOAM data, computing a delay value based on the IOAM data, and generating a histogram based on the computed delay value.

2. The method of claim 1, wherein the one or more IOAM functions further include:
   inserting and/or processing IOAM data in an IOAM header of the data packet; and
   forwarding the data packet to a second network node in the MPLS network, wherein the second network node is associated with a next MPLS label included in the MPLS label stack.

3. The method of claim 1, wherein the one or more IOAM functions further include:
   forwarding the data packet to a second network node in the MPLS network, wherein the second network node is associated with a next MPLS label included in the MPLS label stack; and
   sending an out-of-band response packet from the first network node to a designated network node.

4. The method of claim 1, wherein the one or more IOAM functions further include:
   sending the histogram to a network controller.

5. The method of claim 1, wherein the MPLS network includes an Ethernet virtual private network.

6. The method of claim 1, wherein the data packet is associated with a service function chain; and
   wherein the MPLS label identifies a service function to be implemented on the data packet.

7. The method of claim 1, wherein the MPLS label is allocated to the first network node by a network controller for the MPLS network.

8. The method of claim 1, wherein generating the histogram further comprises:
   providing the computed delay value in a bin of the histogram; and
   incrementing a counter value for the bin of the histogram.

9. The method of claim 8, further comprising
   comparing the counter value of the bin of the histogram to a threshold value; and
   upon determining that the counter value crosses a threshold value, sending the histogram to a network controller.

10. One or more non-transitory computer readable storage media encoded with instructions that, when executed by a processor, cause the processor to:
    receive a data packet that includes a Multiprotocol Label Switching (MPLS) label stack including an MPLS label that prompts a first network node in an MPLS network to implement one or more in-situ operation, administration, and maintenance (IOAM) functions;
    determine that the MPLS label stack includes the MPLS label; and
    upon determining that the MPLS label stack includes the MPLS label, implement the one or more IOAM functions at the first network node, wherein the one or more IOAM functions include collecting IOAM data, computing a delay value based on the IOAM data, and generating a histogram based on the computed delay value.

11. The one or more non-transitory computer readable storage media of claim 10, wherein the one or more IOAM functions further include:
    inserting and/or processing IOAM data in an IOAM header of the data packet; and
    forwarding the data packet to a second network node in the MPLS network, wherein the second network node is associated with a next MPLS label included in the MPLS label stack.

12. The one or more non-transitory computer readable storage media of claim 10, wherein the one or more IOAM functions further include:
    forwarding the data packet to a second network node in the MPLS network, wherein the second network node is associated with a next MPLS label included in the MPLS label stack; and
    sending an out-of-band response packet from the first network node to a designated network node.

13. The one or more non-transitory computer readable storage media of claim 10, wherein the MPLS network includes an Ethernet virtual private network.

14. The one or more non-transitory computer readable storage media of claim 10, wherein the data packet is associated with a service function chain; and
    wherein the MPLS label identifies a service function to be implemented on the data packet.

15. The one or more non-transitory computer readable storage media of claim 10, wherein the first network node is a transit node between an ingress node and an egress node in the MPLS network.

16. The one or more non-transitory computer readable storage media of claim 10, wherein the MPLS label is allocated to the first network node by a network controller for the MPLS network.

17. An apparatus comprising:
    a plurality of network ports configured to receive inbound packets and to send outbound packets in a Multiprotocol Label Switching (MPLS) network;
    a memory; and
    a processor coupled to the memory and to the plurality of network ports, wherein the processor is configured to:
        receive a data packet that includes a MPLS label stack including an MPLS label that prompts the apparatus to implement one or more in-situ operation, administration, and maintenance (IOAM) functions;
        determine that the MPLS label stack includes the MPLS label; and upon determining that the MPLS label stack includes the MPLS label, implement the one or more IOAM functions at the apparatus, wherein the one or more IOAM functions include collecting IOAM data, computing a delay value based on the IOAM data, and generating a histogram based on the computed delay value.

18. The apparatus of claim 17, wherein the one or more IOAM functions further include:
inserting and/or processing IOAM data in an IOAM header of the data packet; and
forwarding the data packet to a next apparatus in the MPLS network, wherein the next apparatus is associated with a next MPLS label included in the MPLS label stack.

19. The apparatus of claim 17, wherein the MPLS network includes an Ethernet virtual private network.

20. The apparatus of claim 17, wherein the data packet is associated with a service function chain; and
wherein the MPLS label identifies a service function to be implemented on the data packet.

* * * * *